United States Patent [19]
Martyny et al.

[11] 3,775,161
[45] Nov. 27, 1973

[54] ELECTRIC LAMP ENVELOPE HAVING CLEAR PROTECTIVE COATING AND METHOD OF MAKING

[75] Inventors: William C. Martyny, Lyndhurst; Ronald J. Olwert, Willoughby, both of Ohio

[73] Assignee: General Electric Company, Schenectady, N.Y.

[22] Filed: Dec. 23, 1971

[21] Appl. No.: 211,779

[52] U.S. Cl................ 117/94, 117/33.5 L, 117/54, 117/64, 117/124 T, 117/124 A, 117/169 R
[51] Int. Cl................... C03c 17/22, H01j 61/35
[58] Field of Search.................. 117/124 T, 124 A, 117/123 A, 94, 169 R, 33.3, 33.5 L; 313/109

[56] References Cited
UNITED STATES PATENTS

| | | | |
|---|---|---|---|
| 3,042,542 | 7/1962 | Anders | 117/124 A X |
| 3,377,494 | 4/1968 | Repsher | 313/109 |
| 3,387,994 | 7/1968 | Dunton et al. | 117/94 X |
| 2,768,909 | 10/1956 | Haslam | 117/33.3 X |
| 3,599,029 | 8/1971 | Martyny | 313/109 |
| 3,235,397 | 2/1966 | Millendorfer | 117/33.3 |

*Primary Examiner*—Ralph Husack
*Attorney*—Ernest W. Legree et al.

[57] ABSTRACT

An electric lamp envelope having an external protective coating which imparts lubricity for the purpose of improving durability and scratch resistance and which also imparts water repellency without reducing light transmission. Particularly useful for fluorescent lamps to reduce flaking or coating off of phosphor caused by vibration resulting from chattering of glass on glass during contact. The coating is very thin transparent film not more than two microns thick containing $TiO_2$ mixed with $MgF_2$, and may be formed by spraying a solution containing an organo titanate such as tetrabutyl titanate and magnesium fluoride on the glass at a temperature between 400° and 700° C.

7 Claims, No Drawings

ELECTRIC LAMP ENVELOPE HAVING CLEAR PROTECTIVE COATING AND METHOD OF MAKING

BACKGROUND OF THE INVENTION

This invention relates to the treatment of glassware used for electric lamp envelopes to improve its strength and resistance to abrasion, and more particularly to the treatment of tubular envelopes for fluorescent lamps.

Elongated low-pressure discharge lamps such as fluorescent lamps are manufactured on high speed automatic equipment. During fabrication, contacts of bulb and bulb to machine part inevitably occur. Surface friction of the bulbs may cause them to seize, that is may cause their external contacting surfaces to take hold suddenly. This results in surface scratches, mars, and abrasion at the points of contact. With higher machine speeds, factory shrinkage due to glass failure has increased and there has also occurred an increase in the proportion of lamp rejects in quality inspection. One of the reasons for this increase is more rapid heating of the glass at the higher machine speed resulting in heat shock. When glass is heated rapidly, scratches and surface flaws form stress risers which may initiate the start of a crack that will eventually result in bulb breakage. Another reason resides in the use of coarser phosphors which have higher efficiency but which require adherence additives for coating. These additives cause etching of the bulbs particularly in high temperature sealing areas. The etching inevitably weakens the bulb and makes it more fragile.

Another problem encountered in lamp manufacturing is the tendency of the phosphor coating to flake off the glass bulb whenever there is sharp glass-to-glass contact. When seizure occurs, the glass bulb has sufficient elasticity to recover from the impact but the phosphor coating may not. The vibration set up in the glass may loosen or rupture the intimate bond between the inner surface of the bulb and the phosphor coating which is apt to flake off at the point of impact.

Various treatments have been used to lubricate the envelopes in order to minimize the tendency for seizure upon contact. The commonest treatment has been to introduce a small amount of sulfur dioxide gas into the atmosphere of the lehr in which the glass tubes are placed after phosphor coating in order to volatilize the binder material. The sulfur dioxide reacts with sodium at the glass surface to form sodium sulphate which is a good glass lubricant. Unfortunately, some sulfur dioxide almost inevitably finds its way into the bulbs which are as yet unsealed at this time, and sulfur dioxide within a fluorescent lamp produces a deleterious effect on lumen maintenance during the service life of the lamp.

In the glassware industry, thin transparent colorless metallic oxide coatings have been developed and used successfully in bottle manufacture to provide surface lubricity. These metallic oxide coatings impart excellent scratch and abrasion resistance properties which materially reduce breakage. Among the compounds that have been used in this connection are titanium, zirconium, vanadium and tin containing compounds which are pyrolyzable, that is chemically decomposed by the action of heat to form oxides of the metal on the glass surface. However these metallic oxide coatings are generally not suitable for use on electric lamp envelopes because they reduce the light transmission of the glass considerably. The reduction in light output from an electric lamp using a bulb coated with such material would be unacceptable.

Another problem encountered with fluorescent lamps arises from the need to provide a hydrophobic or water repellent coating on the external surface of the tube or envelope. Such a coating is necessary in rapid start type lamps to assure reliable starting and is generally desirable on all fluorescent lamps to facilitate starting under high humidity conditions. The films which have been generally used are of the type described in U.S. Pat. No. 2,408,822 — Tanis, and may be of the silicone type made by the hydrolysis of methyl chlorsilane and well known under the trademark Dri-Film. The silicone film is applied at the end of the lamp making process. Unfortunately it tends to cause silicone contamination in the plant particularly in the coating section. If any silicone material happens to deposit on the internal surface of a bulb before it is coated with phosphor, the aqueous suspension by means of which the phosphor is applied to the glass will not form a smooth even coating. This means that more lamp shrinkage will occur as a result of coating defects.

SUMMARY OF THE INVENTION

The object of the invention is to provide an improved external protective coating for electric glassware, a coating which will impart lubricity in order to improve durability and scratch resistance. A desirable attribute of the coating is that it be hydrophobic or water-repellent and a shortcoming found in prior metallic oxide coatings which must be avoided is reduction in light transmission.

In accordance with our invention we provide a permanent protective coating on the external surface of electric glassware such as fluorescent lamp tubes, which comprises titanium dioxide $TiO_2$ and magnesium fluoride $MgF_2$. The film may be formed by spraying a solution containing the organo titanate tetrabutyl titanate $(C_4H_9O)_4Ti$ and magnesium fluoride in an organic solvent such as butyl alcohol on the glass surface at a temperature between 400° and 700°C. Alternatively, tetraisopropyl titanate $(C_3H_7O)_4Ti$ and magnesium fluoride may be used, in which case isopropanol is preferred as a solvent. A reaction takes place on contact of the spray with the hot glass wherein alcohol vapor both from the solvent, and arising out of heat-decomposition of tetrabutyl titanate, is released, and a permanent transparent film containing $TiO_2$ and $MgF_2$ is produced on the glass. The film appears to form an integral part of the glass surface and remains throughout subsequent lamp manufacturing. It has not been possible to remove it without destroying it and its specific chemical nature is not known. However the thickness of the layer which is different from the underlying glass stratum is from 0.05 to 2 microns, typically about 0.5 micron. Careful measurements of the weight added to glass envelopes upon film forming indicate that the weight of retained $TiO_2$ and $MgF_2$ is from 0.6 to 6 grams per square meter of glass surface, preferably 1.4 to 2.4 grams per square meter, and typically 1.9 grams/m².

The ratio of magnesium fluoride to organo-titanate in the spraying solution or mixture should be 1 part by weight $MgF_2$ to 6 to 60 parts by weight $(C_4H_9O)_4Ti$, preferably about 15 to 25 parts, and typically about 20 parts by weight $(C_4H_9O)_4Ti$. A film containing only $TiO_2$ typically may have a transmission loss of 5 percent. Within the preferred limits, the transmission loss is substantially eliminated and separate particles of magnesium fluoride cannot be found. Tetrabutyl titanate contains 23.5 percent by weight $TiO_2$ so that 20 parts by weight $(C_4H_9O)_4Ti$ corresponds to 4.7 parts by weight $TiO_2$, and the corresponding weight ratio of $MgF_2/TiO_2$ is 1/4.7. The weight ratio of $MgF_2$ to $TiO_2$ may vary from 1 part $MgF_2$ to 1.4 to 14 parts $TiO_2$. The preferred range is 1 part by weight $MgF_2$ to 3.5–6 parts by weight $TiO_2$, and the preferred ratio is 1 part $MgF_2$ to 4.7 parts $TiO_2$. If too high a proportion of $MgF_2$ is used, particles of $MgF_2$ can be detected and the film loses lubricity.

Glass derives its strength primarily from an unblemished surface and any scratches or flaws which are present on the surface decrease it considerably. Measurements made on lamp envelopes or tubes in a lamp plant indicate that the scratches and abrasions resulting from typical handling may reduce the strength of the glass to as low as one quarter of its original value. Therefore the most advantageous place for application of the coating in accordance with the invention is on the tubing draw line while there has been as yet no occasion for scratching or abrasion of the glass so that it is at its maximum strength. In practice of the invention in an electric glassware tubing plant, the coating is applied by simply spraying the solution onto the glass in the tubing alley. The film bonds immediately to the glass surface and will not come off in subsequent glass drawing or collaring operations.

SPECIFIC DESCRIPTION

Tetrabutyl titanate $(C_4H_9O)_4Ti$ having a molecular weight of 340 is commercially available (duPont Tyzor TBT) and occurs as a light yellow liquid which forms a clear solution in an organic solvent such as butyl acetate.

Coating Preparation

The solution which is sprayed on the hot glass may be prepared as follows:

| | |
|---|---|
| Butanol (solvent) | 125 ml |
| Tetrabutyl Titanate | 30 ml |
| Magnesium Fluoride | 1.5 grams |
| Thinner (50% butyl acetate, 50% naphtha) | 250 ml |

The chemicals are put together in a suitable container and rolled for several hours in order to mix them thoroughly. The final spray liquid is not a pure solution but consists of a solution of tetrabutyl titanate with a suspension of a magnesium fluoride sol therein.

Application of Coating

In laboratory tests, the coating may be applied to glass envelopes or tubing by heating them to a temperature of approximately 550° C in an electric lehr. The envelope or tube is then transferred onto rotating rolls where it is sprayed with the solution described above while the temperature of the glass is still above 400° C. The solution may be sprayed onto the glass using a standing paint spray gun stationed approximately 3 inches from the glass tubing.

In applying the coating, desirable film thickness may be gauged by the presence of a blue cast which the glass acquires in reflected light. Excessive thickness, that is greater than 2 microns causes a misty appearance. Also if the glass temperature at spraying is too low, that is below 400° C, the coating has a frosty appearance and is easily rubbed off.

For production purposes, the coating is most conveniently applied by spraying the glass on the tubing draw line in the glassware plant. Successful spraying has been done at tubing draw line velocities as high as about 500 feet per minute; the proportion of solvent and thinner is reduced at the higher speeds. In the manufacture of fluorescent lamp envelopes where the tubing is cut and collared, it is desirable to spray the collars after they are formed, in addition to spraying on the tubing draw line. The spraying may be done before or after annealing of the glass.

Lubricity of Glass

It appears that the tetrabutyl (or tetraisopropyl) titanate is the film former resulting in the very thin layer of $TiO_2$ tightly bound to the glass surface to the point where it appears to be an integral part of the glass structure. The magnesium fluoride acts to optimize light transmission and also reacts with the glass so that the resulting composite film has low reflectivity and the glassware proper has high transmission of light. Actual tests in lamp factories have shown a very substantial reduction in scratching and abrading of the glass. The glassware remains slippery throughout lamp manufacture, resulting in a substantial reduction in lamp breakage by comparison with the use of sulfur dioxide in the lehr.

Elimination of Hydrophobic Coating

The film of $TiO_2$ and $MgF_2$ according to the invention is inherently water repellent or hydrophobic. We have found it desirable to buff the lamp envelopes or bulbs on a roller after application of the coating. The surface is rendered permanently water repellent. Tests carried out on fluorescent lamps whereof the envelopes have been coated by the process of the invention prove that the lamps start reliably in high humidity conditions. The protective coating according to the invention thus eliminates the need for a silicone coating with its attendant cost and possible contamination damage.

What we claim as new and desire to secure by Letters Patent of the United States is:

1. Electric glassware comprising a vitreous envelope having on the external surface thereof a protective continuous coating imparting lubricity and water-repellency without appreciable reduction of light transmission, said coating being a layer consisting essentially of magnesium fluoride and titanium dioxide in a weight ratio of 1 part $MgF_2$ to 1.4–14 parts $TiO_2$ and which has added weight in the range of 0.6 to 6 grams per square meter of glass surface.

2. Electric glassware as in claim 1 wherein the weight ratio of $MgF_2$ to $TiO_2$ is 1 to 3.5–6.

3. Electric glassware as in claim 1 wherein the added weight of $MgF_2$ and $TiO_2$ is 1.4 to 2.4 grams per square meter of glass surface.

4. Electric glassware as in claim 1 wherein the weight ratio of $MgF_2$ to $TiO_2$ is 1 to 3.5–6, and the added weight of $MgF_2$ and $TiO_2$ is from 1.4 to 2.4 grams per square meter of glass surface.

5. Electric glassware as in claim 1 wherein the weight ratio of $MgF_2$ to $TiO_2$ is 1 to 3.5–6, the added weight of $MgF_2$ and $TiO_2$ is from 1.4 to 2.4 grams per square meter of glass surface, and said layer has a thickness from .05 to 2 microns.

6. The method of providing an external protective coating on vitreous envelopes of electric glassware which comprises mixing 1 part by weight magnesium fluoride wit 6 to 60 parts by weight of tetrabutyl titanate or tetraisopropyl titanate and an organic solvent to make a suspension, and spraying the resulting liquid on the glassware at a temperature above 400° C and below 700° C to form on the external surface thereof a coating of magnesium fluoride and titanium dioxide.

7. The method of claim 6 wherein 1 part by weight of magnesium fluoride is mixed with 15 to 25 parts by weight of tetrabutyl titanate or tetraisopropyl titanate.

* * * * *